United States Patent [19]

Tatch

[11] Patent Number: 4,467,668

[45] Date of Patent: Aug. 28, 1984

[54] RECIPROCATING ARC-DRIVE MECHANISM

[76] Inventor: Fred G. Tatch, 1656 Walnut St., Eugene, Oreg. 97403

[21] Appl. No.: 445,478

[22] Filed: Nov. 30, 1982

[51] Int. Cl.³ .............................................. G05G 1/14
[52] U.S. Cl. ................................ 74/594.2; 74/501 R; 474/165; 280/255
[58] Field of Search ............... 474/148, 150, 165, 152; 74/810, 142, 141.5, 126, 594.1, 594.2, 501; 280/255, 253, 268, 258

[56] References Cited

U.S. PATENT DOCUMENTS

| | | | |
|---|---|---|---|
| 3,380,309 | 4/1968 | Chisholm | 74/501 |
| 4,052,912 | 10/1977 | Vukelic | 280/253 |
| 4,178,807 | 12/1979 | Young | 280/255 |

FOREIGN PATENT DOCUMENTS

| | | | |
|---|---|---|---|
| 325795 | 4/1935 | Italy | 280/255 |
| 2044194 | 7/1980 | United Kingdom | 280/255 |

Primary Examiner—Ernest R. Purser
Assistant Examiner—Mark J. DelSignore
Attorney, Agent, or Firm—Kolisch, Hartwell, Dickinson & Anderson

[57] ABSTRACT

A device providing reciprocating drive for a vehicle having a sprocket or drive wheel rotatably mounted on a frame. The mechanism is operable to reciprocally rotate a pair of independent hubs which impart a torque on such a wheel in a known direction when rotated in one direction and impart no force when rotated in the other direction. Included in the mechanism is a pair of spaced-apart sheaves rotatably mountable on such a frame and lever arms for applying rotational force to the sheaves. In one preferred embodiment, each sheave is operably attachable to a different hub. A pair of opposing cables with an end fixed on the rim of each sheave extend around separate idler pulleys interposed the sheaves in such a manner that the cables apply opposing rotational forces on each rim when placed under tension. The cables may be connected in such a manner that only one of the sheaves tends to rotate a hub in a torque-imparting direction.

14 Claims, 9 Drawing Figures

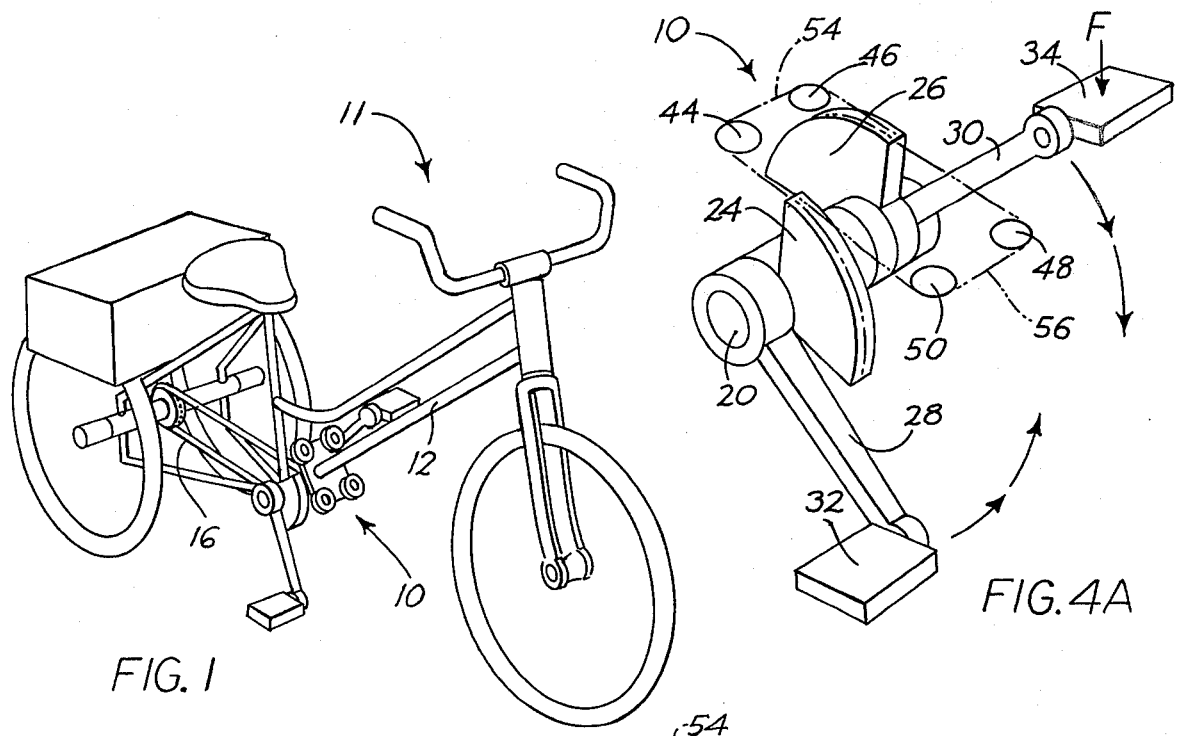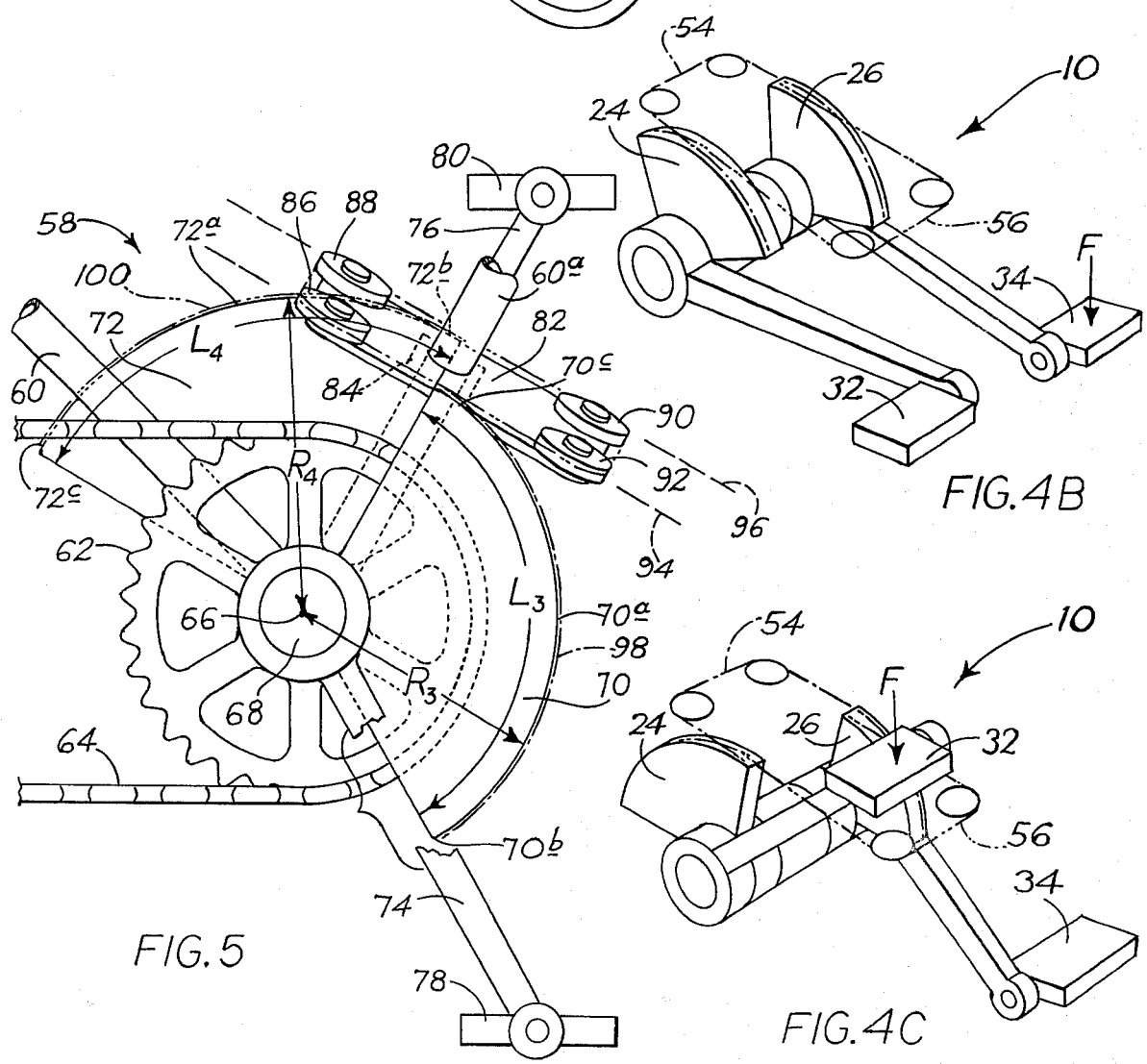

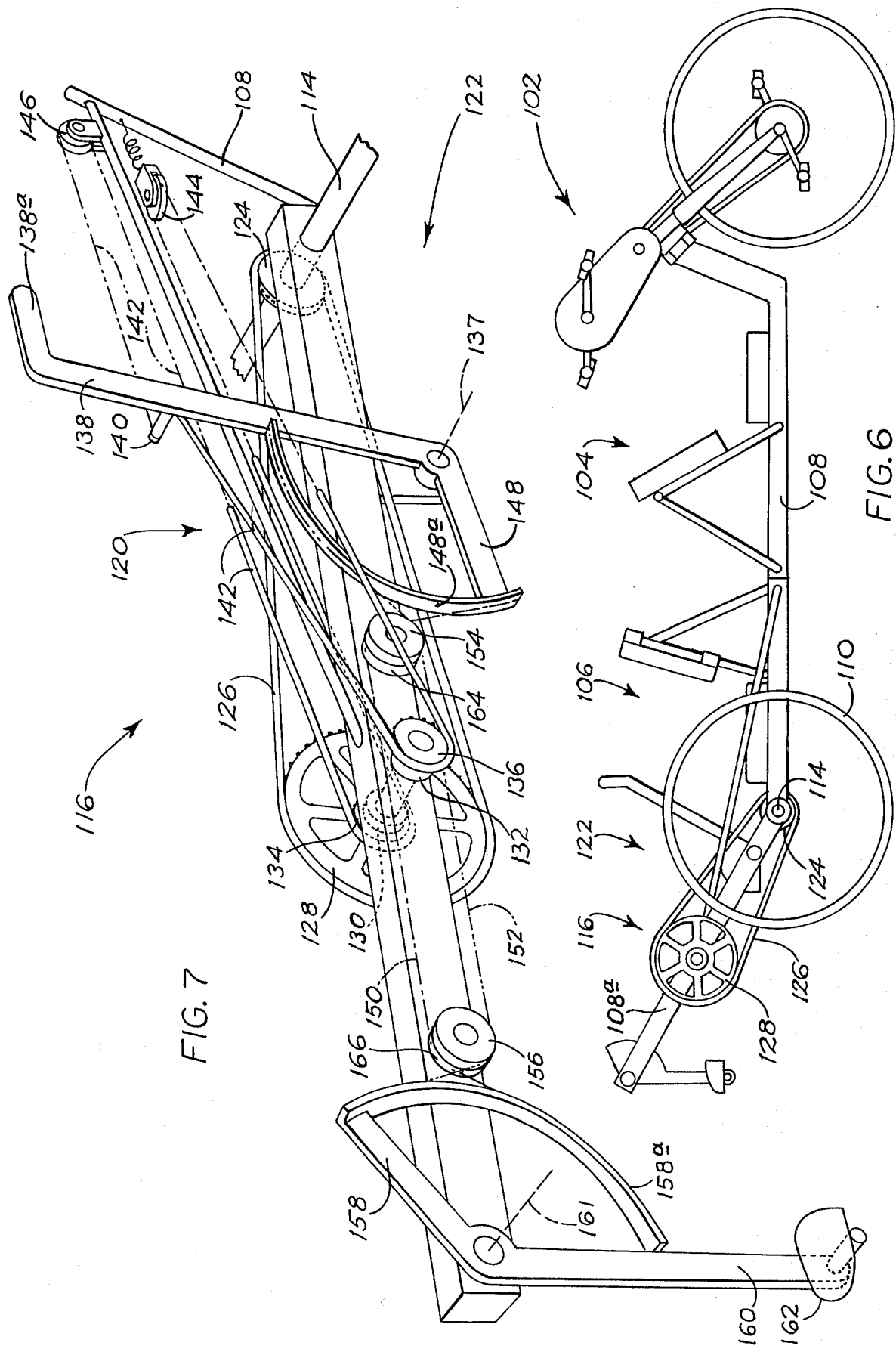

RECIPROCATING ARC-DRIVE MECHANISM

BACKGROUND AND SUMMARY OF THE INVENTION

This invention pertains to a drive mechanism for applying torque uni-directionally to a drive wheel, and in particular, to such a mechanism having a pair of reciprocating force-interacting sheaves.

This invention was developed with reference to land-traveling human-powered vehicles, but may be used in other applications. The invention, as originally conceived, was intended to be used by handicapped persons who are able only to use the quadricipital muscle in the leg, and therefore, are able to extend the leg but are unable to retract it. Additionally, there are such handicapped persons who are able to extend one leg further than the other.

In response to this, as well as other perceived needs, various human-powered vehicles have been developed which are propelled by reciprocating leg motion. Typically, a downward force is applied alternately on a pair of pedals or lever arms in order to propel the vehicle. The pedals are usually connected by various means so that a downward force on one pedal causes the other pedal to rise. Such pedal interconnections are sometimes via a cable extending around pulleys. Constant tension on the cable is required to hold it in position. Alternatively, rigid members are sometimes used in order to assure cooperating reverse and forward motion between the pedals.

It is also desirable to have direct force coupling between a pair of reciprocatable lever arms. This is particularly true with reference to developments in the area of human-powered racing vehicles. Such vehicles typically require the ability to apply driving forces in both reciprocating directions of movement of a lever arm, such as a foot or hand lever, in order to maximize the power applied to the vehicle. Inventions presently known to applicant either provide force application in one direction of a reciprocating-motion device or require a full continuous rotation in a single direction.

It is therefore a general object of a device made in accordance with this invention to overcome some of the disadvantages of the known prior art.

In particular, it is an object to provide a reciprocating-motion device in which forces may be applied continuously.

It is a further object to provide such a device using flexible elements, such as cable, for providing direct force transfer from one force-applying member to another through both directions of reciprocating motion of that member.

Further objects of this invention are to provide a device in which the length of the reciprocating strokes are variable within the limits of operation of the device and to provide for varying the length of strokes between the two force-applying members.

Such objects may be achieved on a vehicle having a rotatable drive wheel which applies the necessary driving force for propelling the vehicle or other appropriate use. Such a vehicle has conventional free-wheeling hubs which may be rotated alternately or jointly in order to apply a rotational torque to the drive wheel when rotated in one direction and to apply no force to the wheel when rotated in the opposite direction. The invention includes a pair of sheaves rotatably mountable on a frame of the vehicle and two sets of adjacent pulleys. A pair of cables, each having one end attached to each sheave rim, extends around a separate set of pulleys in such a manner that the two cables apply, when in tension, opposing rotational forces on each sheave. A lever arm is attached to each sheave for applying reciprocating motion.

It can be seen that such a device provides continuous force application through manipulation of one lever arm or through alternate force application on each lever arm, as is appropriate in a given application. It can also be seen that any length of stroke may be used depending on the length of the arc travelable by each sheave.

Additionally, the radius and arc length of the two sheaves may be unequal in order to provide for less movement by one sheave compared to the other.

These and additional objects and advantages of the present invention will be more clearly understood from a consideration of the drawings and the following detailed description of the preferred embodiments.

BRIEF DESCRIPTION OF THE DRAWINGS

FIG. 1 is a simplified drawing of a vehicle constructed with a first preferred embodiment of the invention.

FIGS. 4A–4C are simplified perspective schematics, not to scale, illustrating operation of the device of FIGS. 1-3.

FIG. 5 is a view similar to FIG. 3, not to scale, of a second preferred embodiment of the invention.

FIG. 6 is a simplified drawing of a vehicle constructed with yet a third preferred embodiment of the invention.

FIG. 7 is an enlarged perspective view of a portion of the vehicle of FIG. 6 showing the third preferred embodiment.

DETAILED DESCRIPTION OF THE INVENTION

Figure 2:
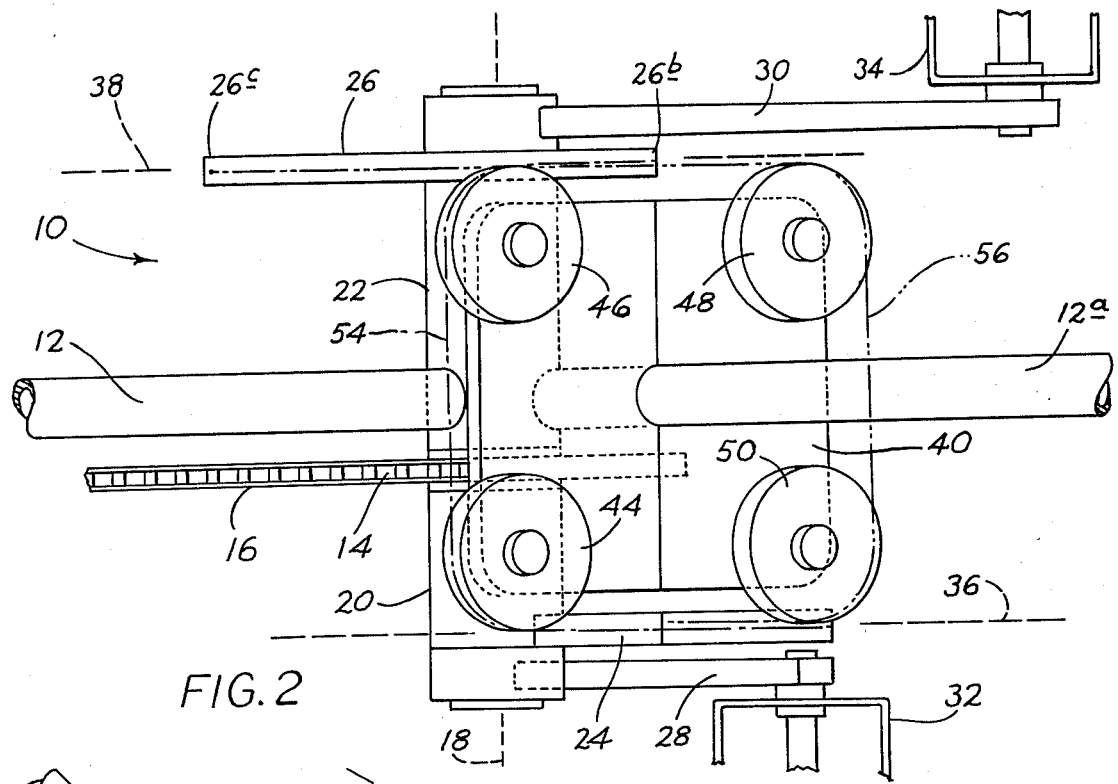
FIG. 2 is an enlarged partially fragmentary top view of a device made in accordance with the present invention.
Figure 3:
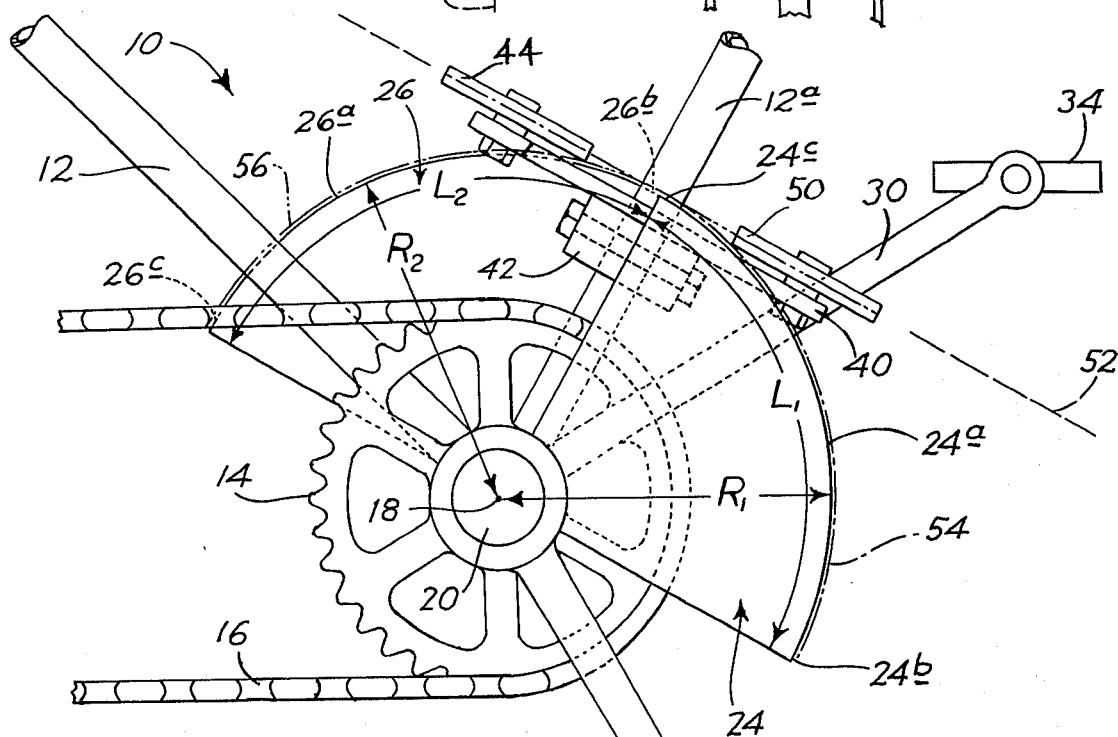
FIG. 3 is a side elevation of the mechanism of FIG. 2.

Referring initially to FIGS. 1, 2, and 3 and describing a first preferred embodiment of the present invention, shown generally at 10 is a reciprocating arc-drive mechanism mounted on a frame 12 of a tricycle 11 for use by handicapped persons. Also mounted on frame 12 is a sprocket or drive wheel 14 which is rotatably mounted on frame 12 suitable for driving a chain 16 which is typically also drivingly engaged with another sprocket wheel associated with a rear axle, not identified. Wheel 14 rotates about an axis 18 shown in dashed lines in FIG. 2. A pair of conventional free-wheeling hubs 20, 22, also rotatable about axis 18, are attached to wheel 14 in such a manner that when they are rotated clockwise, as viewed in FIG. 3, they apply a corresponding clockwise torque on wheel 14. When rotated in a reverse direction relative to wheel 14, they do not impart any torque on the wheel. Such hubs are aptly described in associated prior art and are of a type commonly used for bicycles. Hubs 20, 22, also referred to herein as torque-imparting means, are operable independently of each other except to the extent they are controlled by the present invention, a description of which follows.

Fixedly attached to hubs 20, 22 are sheaves, or sheave portions, 24, 26, respectively. Attachment in this embodiment is by directly bolting each sheave to its associated hub (bolts not shown). In the embodiment shown, each sheave is sector-shaped and subtends an arc of approximately 90°. The outer edges or rims of the sheaves, identified as rims 24a, 26a, have equal circumferential lengths $L_1$, $L_2$, respectively, and are disposed equal radial distances $R_1$, $R_2$, respectively, from axis 18.

In order to make the explanation of mechanism 10 more clear, it will be assumed that movement of vehicle 11 containing mechanism 10 will be considered to move forward by traveling to the right as viewed in FIGS. 1-3. Consistent with this assumption, rims 24a, 26a will be considered to have leading ends 24b, 26b, respectively, and trailing ends 24c, 26c, respectively, as shown, based on their relative proximity to what would be considered the forward part of the vehicle.

In FIGS. 2, 3, sheaves 24, 26 are disposed about axis 18 with trailing end 24c in longitudinal alignment with leading end 26b, in what will later be referred to as an initial position. In this position, when viewed from the side as shown in FIG. 3, the two sheave rims form what appears to be a semicircle. Also fixedly attached to hubs 20, 22, and therefore sheaves 24, 26, are a pair of lever arms 28, 30, respectively, also referred to as force-applying means. The distal ends of arms 28, 30 have conventional bicycle pedals 32, 34, respectively, pivotally mounted thereon. As will become apparent from further discussion, arms 28, 30 are disposed relative to sheaves 24, 26 in order to provide the most convenience in operation for a user of a vehicle containing mechanism 10.

Sheaves 24, 26 are generally planar in construction and may be considered to be rotatable within planes 36, 38, respectively, as shown in FIG. 1 by the dashed lines so numbered. These planes are normal to axis 18.

Interposed sheaves 24, 26 is a mounting plate 40, the plane of which is generally perpendicular to sheave planes 36, 38. For ease of construction, plate 40 is preferably made of two individual plates suitably attached together and fixedly mounted on a support bar 12a of frame 12 by suitable mounting means, such as clamp 42 shown in FIG. 3.

Freely rotatably mounted on the upper surface of plate 40 are four coplanar pulleys 44, 46, 48, 50, mounted at the corners of the plate, as shown. Pulleys 44, 46, 48, 50 are also referred to herein as first, second, fourth and third pulley means, respectively. In this embodiment particularly, pulley pairs 44, 46 and 48, 50 could be replaced by single pulleys. These pulleys are all rotatable about a common plane 52 shown in dashed lines in FIG. 3. Plane 52 is generally tangential to rims 24a, 26a. Sheave planes 36, 38, or planes parallel to them, are tangential to the perimeters of pulleys 44, 50 and 46, 48, respectively. Thus, a general line of tangency, formed by the intersection of a sheave plane and the pulley plane, exists between each rim and the perimeter of an associated pulley.

A flexible generally non-extensible cable 54, also referred to herein as a first flexible element, is fixedly attached to rim end 24b and is shown in dash-dot lines extending along the length of rim 24a. Cable 54 extends beyond end 24c and generally around what may be considered the outer perimeter of pulley 44 across to the outer perimeter of pulley 46 and then over rim 26a to leading end 26b where it is fixedly attached. In the embodiment shown, the outer edges of the perimeters of pulleys 44 and 46 are disposed so that cable 54, when in contact with each sheave, lies in a groove (not shown) coplanar with the line of tangency extending between the pulleys and rims. Cable 54 therefore generally forms a somewhat distorted U-shape.

Similarly, a second flexible element or cable 56, shown in dash-dot-dot lines in FIGS. 2, 3 is attached to trailing rim edge 24c from which it extends around the outer perimeters of pulleys 50, 48 and then back along a corresponding groove, not shown, in rim 26a to the trailing end 26c where it is fixedly attached.

Cables 54, 56 are installed without slack in order to hold them in the described configuration. It can be seen that each cable, when placed in tension, tends to apply a rotational force on each sheave which is opposite in direction from the rotational force applied by the other cable. The cables, therefore, cooperate to hold the mechanism in the position shown.

It will also be observed, based on the preceding assumption, that a clockwise rotation of a sheave, and therefore wheel 14, produces a propelling force on a vehicle in which mechanism 10 is operatively constructed. Cable 54, under tension, tends to apply a counterclockwise force on the sheaves. Correspondingly, cable 56 tends to apply a clockwise force on each sheave.

Directing attention now particularly to FIGS. 4A-4C, the operation of mechanism 10 will be described. It will be recalled that sheaves 24, 26 are fixedly mounted onto hubs 20, 22, respectively, and are thereby rotatable unitarily with the hubs relative to wheel 14. FIG. 4A illustrates, in a perspective view, a simplified sketch of the mechanism of FIGS. 2 and 3 on a reduced scale. This is what I will refer to as an initial position, although as will become clear through continued discussion, any position of the various elements within mechanism 10 could be considered an initial position. A handicapped person may only be able to apply a downward force on each pedal by extending a leg against that pedal but be unable to retract the leg after extension. It is therefore expected that with pedal 34 in a raised position as shown, a force shown as F in FIG. 4A is applied. This applies a rotational force on sheave 26 causing it to rotate forward in clockwise direction as viewed from the left of the figure. This applies a torque to wheel 14 through hub 22. In so doing, cable 54 pulls sheave 24 and arm 28 in a counterclockwise direction.

With continued downward force on pedal 34, the rotation described occurs with pedal 32 being driven upwardly. FIG. 4B shows an intermediate position in which pedal 34 has now assumed a lower position and pedal 32 a higher position. FIG. 4C shows the final position of the pedals and corresponding sheaves, which is also the initial position of the second phase of a pedaling cycle. The second phase operates very similar to the first just described except that the force is applied to sheave 24 from pedal 32. Cable 54 now pulls sheave 26 and pedal 34 upwardly as pedal 32 is forced downwardly.

It should also be noted that if one were to move only pedal 32 upwardly and downwardly, pedal 34 would be caused to move oppositely. In such a case, during an upward stroke of pedal 32, cable 56 would be imparting a downward force on sheave 26 and pedal 34.

It can therefore be seen that the configuration of sheaves and pulleys of mechanism 10 provides continuous cooperative force-conveying movement between the vehicle pedals regardless of which direction a force is applied. It should further be noted that by supporting the cables on the rims of the sheaves, there is no slack allowed in the cable runs during any portion of a pedaling cycle. The rims always maintain a constant-length travel path for the cables. In other words, as one cable unwraps from one rim it wraps around the other rim a corresponding amount so that the length of the path is always constant.

Directing attention now to FIG. 5 and discussing a second preferred embodiment, a mechanism very similar to mechanism 10 is shown generally as mechanism 58 attached to a tricycle frame 60, including a support bar 60a extending as shown. Sprocket wheel 62 drives a chain 64 and is rotatable about axis 66. Mechanism 58 also includes a pair of hubs such as hub 68. A pair of sheaves 70, 72 each have rims 70a, 72a with leading ends 70b, 72b, respectively and trailing ends 70c, 72c, respectively. Rim 70a has a length $L_3$ and is disposed a distance $R_3$ from axis 66. In the embodiment shown, rim 72a is the same as rim 26a, having a length $L_4$ equal to $L_2$ disposed a radial distance $R_4$ equal to $R_2$ from axis 66. However, rim 70a is not equal to that of rim 24a. Instead, distance $R_3$ is approximately three-fourths of $R_1$. Also, sheave 70 extends about an arc of approximately 120° (or four-thirds of the 90° arc of sheave 72). As a result, rim length $L_3$ equals $L_1$.

Mechanism 58 also includes lever arms 74, 76 to the distal ends of which are rotatably attached conventional pedals 78, 80, respectively. Additionally, interposed sheaves 70, 72 is a mounting plate 82 fixedly held on to support bar 60a by a clamp 84. A set of four pulleys are disposed on plate 82 the same as the pulleys on plate 40 of mechanism 10, including a first pulley 86, second pulley 88, fourth pulley 90 and third pulley 92. A line 94, shown in dashed lines, is a line generally tangent to the perimeters of pulleys 86, 92 and rim 70a. A corresponding line 96, also shown in dashed lines, is generally tangent to pulleys 88, 90 and rim 72a. Lines 94, 96 are parallel and define a pulley plane very similar to pulley plane 52 associated with mechanism 10.

A cable 98 having fixed ends extends from rim end 70b, over rim 70a to pulley 86, around pulley 88 and over rim 72a to end 72b, as shown. Similarly, an opposing cable 100 extends from end 70c, around pulleys 92, 90 to rim 72a.

Operation of the embodiment shown in FIG. 5 is for the most part the same as that discussed with reference to the first-discussed preferred embodiment. However, because of the difference in the arc subtended by each sheave, lever arm 74 will reciprocatingly rotate through an arc of approximately 120° while arm 76 rotates only through an arc of approximately 90°. This difference in arc travelable by each lever arm is obtained by the difference in the sheave rim radius and length.

The advantage of this configuration, relative to the first preferred embodiment in which both sheaves were of the same size, is that a person with limited mobility in one leg relative to the other can obtain a reciprocating pedaling motion which accommodates that difference.

It can be seen that the full arc subtended by each sheave is not required during a pedaling operation. For instance, a person using the embodiment of FIG. 5 could pedal arm 76 through an arc of approximately 45° and arm 74 through a corresponding 60° arc. Thus, any amount of movement essentially less than or equal to that allowed by the length of the sheave arc would be operable with this type of system.

Also, as with the first preferred embodiment, cables 98, 100 are always kept taught by having the cables wrap around the sheave rims with the length of cable extending between the rim and associated pulley perimeter lying on tangent lines 94, 96.

Addressing finally a third preferred embodiment and referring to FIGS. 6, 7, an embodiment is shown which is used in a human-powered land-traveling vehicle used particularly for racing. The vehicle, shown very generally at 102, includes a front portion 104 and a rear portion 106.

Vehicle 102 includes a frame 108 supporting and connecting each portion. Front portion 104 is constructed generally according to the bicycle disclosed in my U.S. Pat. No. 4,326,728, entitled "Fairing for Ground-Traveling Vehicle". The rear wheel of the vehicle disclosed in that patent has been removed and the remaining bicycle pivotally attached to frame 108.

Rear portion 106 includes a pair of coaxial ground-contacting wheels, such as wheel 110, connected by an axle 114. Each wheel 110 has associated with it a corresponding drive system, such as system 116, as shown.

Referring particularly to FIG. 7, a drive system 116 is shown attached to frame 108 for driving axle 114. Frame 108 includes support bar 108a which extends generally rearwardly and obliquely upwardly. As will be further discussed, drive system 116 includes a force-transferring assembly 120 as part of a reciprocating arc-drive mechanism 122 made in accordance with this invention. However, system 116 also includes a sprocket wheel 124 disposed on axle 114 which is driven by a chain 126 from another sprocket wheel 128 rotatably mounted on what may be considered the outer side of bar 108a. Coaxially mounted with wheel 128 are a pair of free-wheeling hubs, 130, 132, which are constructed like hubs 20, 22 of the first preferred embodiment. Hub 130 is disposed on the outer side of bar 108a adjacent wheel 128 with the other hub 132 disposed on the inner side of the bar. Hubs 130, 132 are constructed to apply a clockwise force on sprocket wheel 128 when rotated in the same direction, as viewed in FIG. 7, and to provide no force when rotated in the reverse direction.

Included within assembly 120, which is also referred to as driving connection means, are a pair of sprocket wheels 134, 136 fixedly attached to hubs 130, 132, respectively. Mounted on bar 108a interposed axle 114 and hubs, 130, 132, for pivoting about an axis 137, is a hand lever arm 138 which extends upwardly to a hand grip 138a disposed at its distal end. Intermediate its ends and extending generally outwardly to the side is a rod 140. Connected to rod 140 adjacent arm 138 is a chain 142. Chain 142 extends from rod 140 over hub sprocket wheel 136, forwardly therefrom to an idler pulley 144 which is spring-biasedly and rotatably mounted on frame 108 above bar 108a. From pulley 144, chain 142 extends around the other hub sprocket wheel 134 and back to a second idler pulley 146 which is rotatably mounted to frame 108 as shown. From pulley 146, chain 143 extends rearwardly to the distal end of rod 140. Chain 142 is disposed over wheels 134 and 136 in such a manner that movement of the chain, such as by movement of bar 138, causes the two hubs to rotate in opposite directions. The apparatus associated with chain 142, including rod 140 and sprocket wheels 134, 136, are part of assembly 120.

Addressing now the further construction of mechanism 122, bar 138 has fixedly attached to it a sheave 148 subtending an angle of approximately 120° and having a grooved outer rim 148a. Sheave rim 148a is disposed generally in a plane which is normal to pivot axis 137 and is generally parallel with support arm 108a. Attached to opposite ends of rim 148a similar to that discussed with respect to the previous two embodiments, are a pair of cables 150, 152, with cable 152 being attached to the end of rim 148a adjacent arm 138.

Cable 150 extends from the rim over a first pulley 154 mounted on bar 108a for rotation in a plane generally parallel with the plane of sheave 148. The cable then extends over a second pulley 156 similarly mounted coplanar with pulley 154. From the second pulley, cable 150 extends down around a rim 158a of a second sheave 158 to what may be considered the lower end of the rim. Sheave 158 is disposed generally coplanar with sheave 148 and is similarly attached to a foot lever arm 160 which is also pivotally attached to bar 108a for pivoting in the plane of sheave 158 about an axis 161. Disposed on the bottom or distal end of arm 160 is a conventional bicycle-type foot stirrup 162.

Similar to cable 150, cable 152 extends from sheave 148 around the lower perimeter of a third pulley 164 which is coaxially mounted with pulley 154, around the lower perimeter of a fourth pulley 166 coaxially mounted with second pulley 156 and then upwardly to the end of rim 158a opposite from the end of attachment of cable 150. Cables 150, 152 extend between each pulley and its associated rim along tangent lines as discussed with respect to the first two embodiments.

During operation, vehicle 102 is driven with one person facing forward for powering front portion 104 and a second person facing rearward for powering rear portion 106. In discussing operation of this third preferred embodiment, it will be seen that it functions very similarly to the first preferred embodiment except for the connection to the free-wheeling hubs. In this embodiment, it should be apparent that pivoting hand bar 138 forwardly and rearwardly causes chain 142 to rotate hubs 130, 132 in both directions, with each direction of movement of bar 138 causing one of the hubs to rotate sprocket 128 in a clockwise, torque-applying, direction. Thus, force is continuously being applied to wheel 128 during both forward and rearward reciprocating movements of bar 138. Pulley 144 is spring-biased to accommodate the change in the relative distances in the extension of chain 142 first from rod 140 to sprocket 136 and second from rod 140 to pulley 146. This is due to rod 140 traveling in a non-linear arc with movement of bar 138.

In contrast, the length of the travel paths for cables 150, 152 are always constant due to the use of sheaves 148, 158, as has been discussed previously.

It will be also understood from the previous dicussion that bar 138 can be reciprocatingly pivoted by simply moving foot lever arm 160 in a reciprocating motion. When arm 160 is pushed rearwardly, in a clockwise direction as shown in FIG. 6, cable 150 is put in tension pulling sheave 148 and arm 138 also in a clockwise direction. When a counterclockwise torque is applied on arm 160, cable 152 is put in tension, causing a counterclockwise rotation of arm 138. Thus, movement of only arm 160 can propel the vehicle. The present embodiment provides a desirable racing vehicle by permitting constant force application to both the hand and foot lever arms, thereby maximizing the energy applied in propelling the vehicle forward.

It will be appreciated by those skilled in the art that by changing the radial distance of a sheave rim relative to its pivot point that different arcs of reciprocation may be achieved for hand and foot bars 138, 160. The previous discussion relating to the second preferred embodiment relative to the first is also be applicable here in this regard.

In can therefore be seen that while the invention has been particularly shown and described with reference to the foregoing preferred embodiments, it will be understood by those skilled in the art that other changes in form and detail may be made therein without departing from the spirit and scope of the invention as defined in the following claims.

It is claimed and desired to secure by Letters Patent:

1. Reciprocating arc-drive mechanism for use in a vehicle having a frame, a drive wheel mounted on the frame, and a pair of torque-imparting means attached to the wheel and rotatable independently for imparting alternately a torque in a known direction on the wheel when rotated in one direction and for imparting substantially no torque when rotated in the opposite direction, said mechanism comprising a pair of spaced-apart sheave portions attachable rotatably about known axes to such a frame, each portion having a generally arcuate rim disposed a known radial distance from the respective axis of rotation, means for drivingly connecting said sheave portions to such previously mentioned torque-imparting means in such a manner that rotation of each portion effects a corresponding rotation of each torque-imparting means, means attached to at least one of said sheave portions for applying forces thereto for effecting reciprocal rotation thereof, first, second, third and fourth pulley means attachable to the frame adjacent said sheave portions, each pulley means having a generally circular perimeter disposed adjacent an associated sheave portion rim, said first and third pulley means being associated with one of said sheave portions, and said second and fourth pulley means being associated with the other portion, a first flexible, substantially non-extensible, element having one end anchored on each rim and extending, intermediate its ends, around the perimeters of said first and second pulley means, said first element, when tensed, tending to rotate each sheave portion in a given direction for the portion, and a second flexible, substantially non-extensible, element also having one end anchored on each rim and extending, intermediate its ends, around the perimeters of said third and fourth pulley means, tending, when tensed, to rotate each sheave portion in the direction opposite the above-mentioned given direction for the portion.

2. The mechanism of claim 1 wherein each pulley is disposed in such a manner that there exists a line concurrently tangent to each perimeter and its associated rim with said elements extending generally along said respective tangent lines.

3. The mechanism of claim 2 wherein said first and third pulley means are coaxial and said second and fourth pulley means are coaxial.

4. The mechanism of claim 2 wherein said first and third pulley means are coplanar and said second and fourth pulley means are also coplanar.

5. The mechanism of claim 2 wherein all said pulley means are coplanar.

6. The mechanism of claim 2 wherein said sheave portions are disposed in generally parallel planes.

7. The mechanism of claim 2 wherein said sheave portions are coaxial.

8. The mechanism of claim 2 wherein said sheave portions and pulley means are all disposed in parallel planes.

9. The mechanism of claim 2 wherein the radii of said sheave portion rims are unequal.

10. The mechanism of claim 2 wherein said connecting means is constructed in such a manner that rotation of each sheave in a given direction effects rotation of only one torque-imparting means in the previously-mentioned one direction.

11. Reciprocating arc-drive mechanism for use in a vehicle having a frame, a sprocket wheel mounted on the frame suitable to drive a chain, and a pair of independently acting hubs drivingly attached to such a sprocket wheel rotatable about a known axis to impart alternately a torque in a known direction on the wheel when rotated in one direction and to impart no torque when rotated in the opposite direction, said mechanism comprising a sheave portion fixedly attachable to each hub, each portion having an arcuate rim with centers of radius disposed on the axis, disposed in a plane perpendicular to the axis, means attached to at least one of said sheave portions for applying forces thereto for effecting reciprocal rotation thereof, first, second, third and fourth pulley means attachable to such a frame adjacent said sheave portions, each pulley means having a generally circular perimeter disposed in such a manner that there exists a line concurrently tangent to said perimeter and to an associated rim, said first and third pulley means being associated with one sheave portion and said second and fourth pulley means being associated with the other sheave portion, a first flexible element having one end anchored on each rim and extending intermediate its end along the corresponding tangent lines and around the perimeters of said first and second pulley means, and a second flexible element also having one end anchored on each rim and extending intermediate its ends along the corresponding tangent lines and around the perimeters of said third and fourth pulley means, said mechanism being constructed to effect rotation of only one hub in a torque-imparting direction during rotation of one of said sheave portions in each given direction.

12. The mechanism of claim 11 wherein the radii of the rims of said sheave portions are unequal.

13. The mechanism of claim 11 wherein the ends of said elements are anchored adjacent opposite ends of each rim and the lengths of said rims are equal.

14. The mechanism of claim 13 wherein the radii of the rims of said sheave portions are unequal.

* * * * *